(12) United States Patent
Malard et al.

(10) Patent No.: US 6,735,879 B2
(45) Date of Patent: May 18, 2004

(54) LASER LINE GENERATING DEVICE

(75) Inventors: Fabrice J. Malard, Pleasant Prairie, WI (US); Ryan K. Hopper, Lincoln, NE (US); Daniel L. Poole, Phoenix, AZ (US); Robert N. Poole, Phoenix, AZ (US)

(73) Assignee: Irwin Industrial Tool Company, Raleigh, NC (US)

( * ) Notice: Subject to any disclaimer, the term of this patent is extended or adjusted under 35 U.S.C. 154(b) by 0 days.

(21) Appl. No.: 10/141,392

(22) Filed: May 7, 2002

(65) Prior Publication Data

US 2002/0178596 A1 Dec. 5, 2002

Related U.S. Application Data

(60) Provisional application No. 60/291,135, filed on May 15, 2001.

(51) Int. Cl.[7] .......................... G01C 15/00; G01B 11/26
(52) U.S. Cl. ............................ 33/286; 362/259; 362/119
(58) Field of Search ........................ 33/286, 227, 228, 33/281, 282, 283, 285, DIG. 21, 451, 347, 755, 761, 769, 668; 362/119, 253, 259, 362, 339, 340; 200/61.62, 10, 61.82

(56) References Cited

U.S. PATENT DOCUMENTS

| | | | |
|---|---|---|---|
| 1,153,760 A | * | 9/1915 | Butler .......................... 33/370 |
| 1,308,809 A | | 7/1919 | Reese |
| 2,431,491 A | * | 11/1947 | Lee et al. .................... 362/137 |
| 2,759,696 A | | 8/1956 | Nelson |
| 3,576,409 A | | 4/1971 | Fiddler |
| 3,628,874 A | | 12/1971 | Tagnon |
| 3,635,565 A | | 1/1972 | Colson |
| 3,713,614 A | | 1/1973 | Taylor |
| 3,820,903 A | | 6/1974 | Kindl et al. |
| 3,847,708 A | | 11/1974 | Kaiser |
| 3,897,637 A | | 8/1975 | Genho |
| 3,964,824 A | | 6/1976 | Dixon |
| 4,031,629 A | | 6/1977 | Paluck |
| 4,099,118 A | | 7/1978 | Franklin et al. |
| 4,111,564 A | | 9/1978 | Trice, Jr. |
| 4,310,797 A | | 1/1982 | Butler |
| 4,439,927 A | | 4/1984 | Elliott |
| 4,464,622 A | | 8/1984 | Franklin |
| 4,700,489 A | | 10/1987 | Vasile |
| 4,751,782 A | | 6/1988 | Ammann |
| 4,766,673 A | | 8/1988 | Bolson |
| 4,852,265 A | | 8/1989 | Rando et al. |
| 4,853,617 A | | 8/1989 | Douglas et al. |
| 4,859,931 A | | 8/1989 | Yamashita et al. |

(List continued on next page.)

FOREIGN PATENT DOCUMENTS

WO     WO 98/51994     11/1998

OTHER PUBLICATIONS

International Search Report, dated Aug. 20, 2002, for corresponding international application PCT/US02/14416.
Written Opinion, dated May 27, 2003, for corresponding international application no. PCT/US02/14416.

*Primary Examiner*—Diego Gutierrez
*Assistant Examiner*—Amy R Cohen
(74) *Attorney, Agent, or Firm*—Brinks Hofer Gilson & Lione

(57) ABSTRACT

A self-contained line generating device uses a laser diode and a lens to project a fan-shaped beam of visible light. The lens is useful for receiving light and transmitting light in an asymmetrical planar beam. The light is useful for aligning objects in a vertical or a horizontal line. The generator also includes a substantially flat face and leveling devices for leveling and orienting the generator onto a flat surface. Retractable pins enable a user to easily mount the line generator onto a wall and align objects.

54 Claims, 10 Drawing Sheets

U.S. PATENT DOCUMENTS

| | | |
|---|---|---|
| 4,912,851 A | 4/1990 | Rando et al. |
| 4,992,741 A | 2/1991 | Douglas et al. |
| 4,993,161 A | 2/1991 | Borkovitz |
| 5,046,851 A * | 9/1991 | Morgan ............... 356/615 |
| 5,075,977 A | 12/1991 | Rando |
| 5,144,487 A | 9/1992 | Hersey |
| 5,148,108 A | 9/1992 | Dufour |
| 5,208,438 A | 5/1993 | Underberg |
| D339,074 S | 9/1993 | Dufour |
| 5,243,398 A | 9/1993 | Nielsen |
| 5,264,670 A | 11/1993 | Leonard |
| 5,287,365 A | 2/1994 | Nielsen et al. |
| 5,287,627 A | 2/1994 | Rando |
| 5,317,253 A | 5/1994 | Kronberg |
| 5,329,433 A * | 7/1994 | Geeting et al. ............ 362/154 |
| 5,367,779 A | 11/1994 | Lee |
| 5,394,616 A | 3/1995 | Claxton |
| 5,446,635 A * | 8/1995 | Jehn ..................... 362/259 |
| 5,457,394 A | 10/1995 | McEwan |
| 5,459,932 A | 10/1995 | Rando et al. |
| 5,524,352 A | 6/1996 | Rando et al. |
| 5,539,990 A | 7/1996 | Le |
| 5,552,886 A | 9/1996 | Kitajima et al. |
| 5,572,367 A * | 11/1996 | Jung et al. ............... 359/708 |
| 5,584,458 A | 12/1996 | Rando |
| 5,594,993 A | 1/1997 | Tager et al. |
| 5,604,987 A | 2/1997 | Cupp |
| 5,610,711 A | 3/1997 | Rando |
| 5,617,202 A | 4/1997 | Rando |
| 5,619,802 A | 4/1997 | Rando et al. |
| 5,621,975 A | 4/1997 | Rando |
| D382,255 S | 8/1997 | Moffatt |
| 5,666,736 A | 9/1997 | Wen |
| 5,742,387 A | 4/1998 | Ammann |
| 5,754,582 A | 5/1998 | Dong |
| 5,782,003 A | 7/1998 | Bozzo |
| 5,819,424 A | 10/1998 | Ohtomo et al. |
| 5,838,431 A * | 11/1998 | Hara et al. ............... 356/138 |
| 5,842,282 A * | 12/1998 | Ting ..................... 33/227 |
| 5,864,956 A | 2/1999 | Dong |
| 5,872,657 A | 2/1999 | Rando |
| 5,882,106 A * | 3/1999 | Galli ..................... 362/259 |
| 5,907,907 A | 6/1999 | Ohtomo et al. |
| 5,917,587 A | 6/1999 | Rando |
| D412,674 S | 8/1999 | Kaiser |
| 5,967,645 A * | 10/1999 | Anderson ................ 362/259 |
| 5,982,299 A * | 11/1999 | Shemwell ................ 340/953 |
| 5,983,510 A | 11/1999 | Wu et al. |
| 5,992,029 A | 11/1999 | Dong |
| 6,000,813 A | 12/1999 | Krietzman |
| 6,005,716 A | 12/1999 | Ligtenberg et al. |
| 6,005,719 A | 12/1999 | Rando |
| 6,009,630 A | 1/2000 | Rando |
| 6,012,229 A | 1/2000 | Shiao |
| 6,037,874 A | 3/2000 | Heironimus |
| 6,065,217 A | 5/2000 | Dong |
| 6,073,353 A | 6/2000 | Ohtomo et al. |
| 6,073,354 A | 6/2000 | Rando |
| 6,082,013 A | 7/2000 | Peterhans |
| 6,082,875 A | 7/2000 | Kousek |
| 6,101,728 A | 8/2000 | Keng |
| 6,163,969 A * | 12/2000 | Jan et al. ................. 33/282 |
| 6,178,649 B1 | 1/2001 | Wu |
| 6,195,902 B1 * | 3/2001 | Jan et al. ................. 33/286 |
| 6,202,312 B1 * | 3/2001 | Rando ..................... 33/227 |
| 6,209,219 B1 | 4/2001 | Wakefield et al. |
| 6,211,662 B1 | 4/2001 | Bijawat et al. |
| 6,215,293 B1 | 4/2001 | Yim |
| 6,249,113 B1 | 6/2001 | Krantz et al. |
| 6,259,241 B1 | 7/2001 | Krantz |
| 6,301,997 B1 | 10/2001 | Welte |
| 6,351,890 B1 | 3/2002 | Williams |
| 6,360,446 B1 * | 3/2002 | Bijawat et al. ............ 33/451 |
| 6,363,622 B1 | 4/2002 | Stratton |
| 6,452,097 B1 | 9/2002 | DeWall |
| 6,478,452 B1 * | 11/2002 | Richardson et al. ........ 362/268 |
| 6,493,955 B1 * | 12/2002 | Moretti .................. 33/451 |
| 6,493,995 B2 | 12/2002 | Moretti |
| 6,494,371 B1 * | 12/2002 | Rekow et al. ............. 235/454 |
| D469,556 S | 1/2003 | Malard et al. |
| 6,502,319 B1 * | 1/2003 | Goodrich et al. ........... 33/286 |
| D470,423 S | 2/2003 | Loudenslager et al. |
| 6,513,954 B2 * | 2/2003 | Ebersole .................. 362/339 |
| 6,532,676 B2 | 3/2003 | Cunningham |
| 2001/0007420 A1 | 7/2001 | Bijawat et al. |
| 2001/0029675 A1 | 10/2001 | Webb |
| 2001/0034944 A1 | 11/2001 | Cunningham |
| 2002/0178596 A1 | 12/2002 | Malard et al. |

* cited by examiner

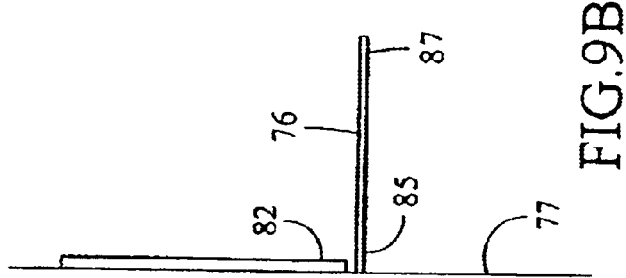
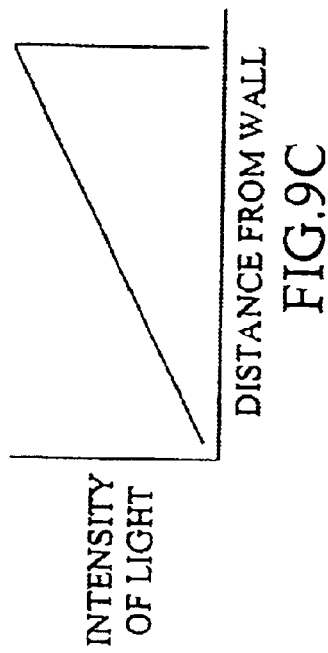
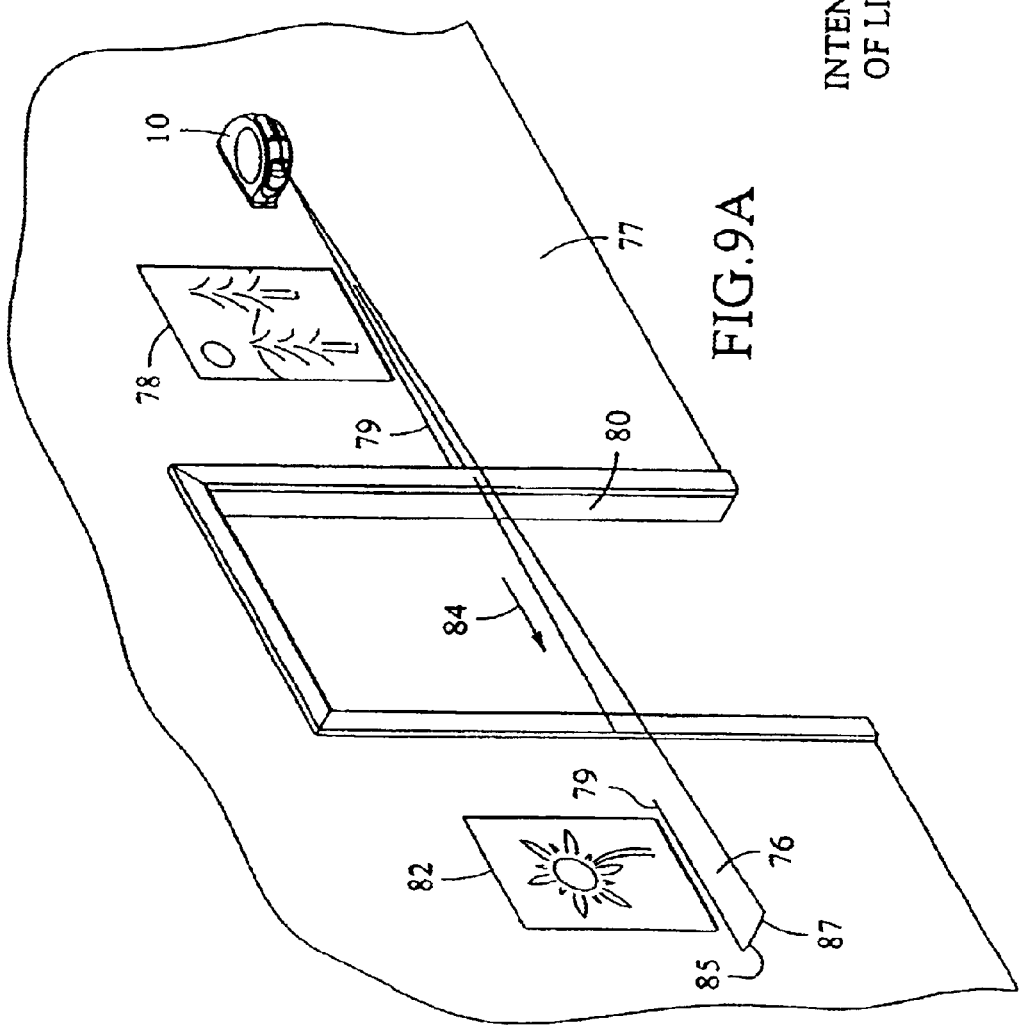

Prism Curvature

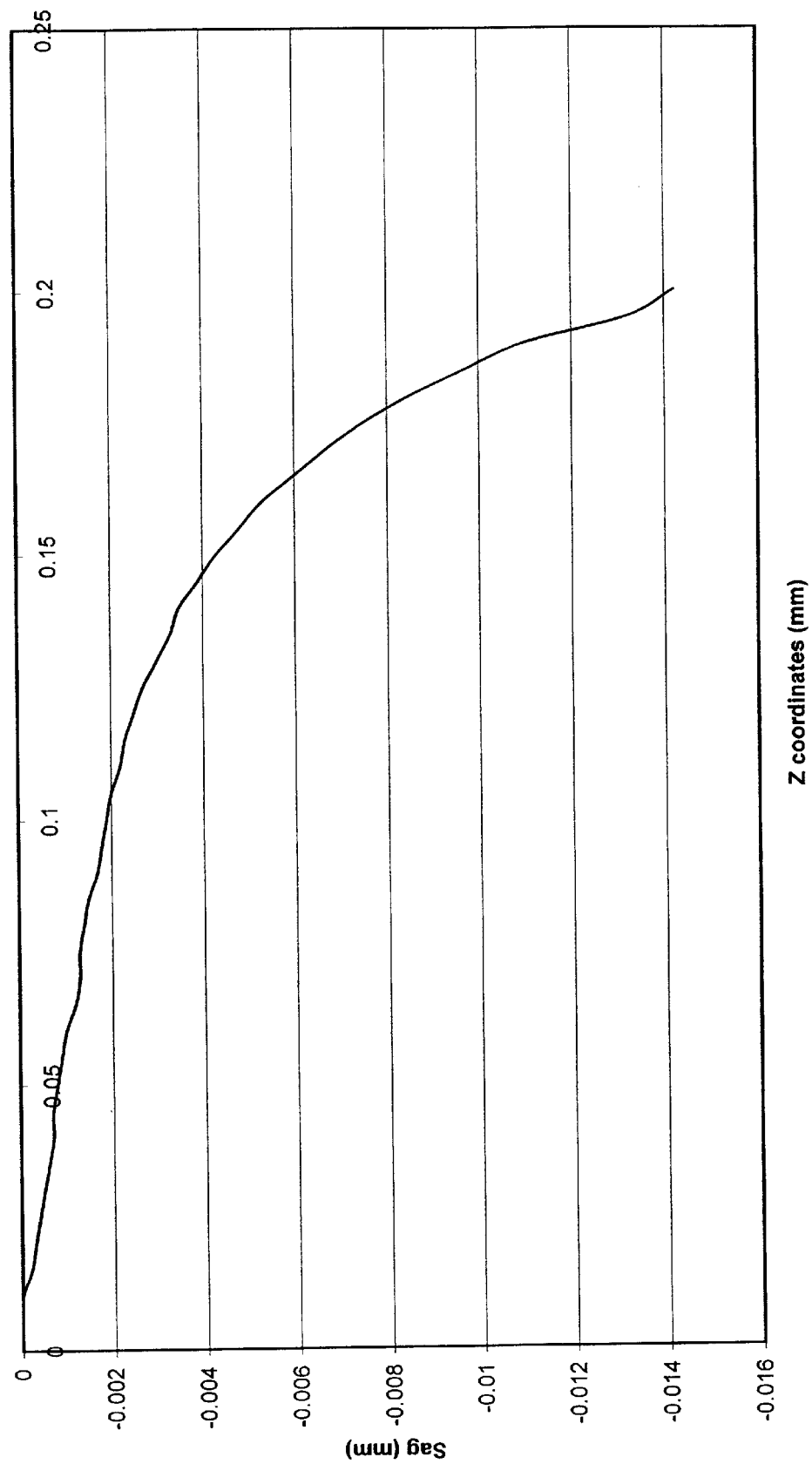

LASER LINE GENERATING DEVICE

CLAIM TO PRIORITY

This application claims the benefit of priority under 35 U.S.C. § 119(e) to the filing date of U.S. Provisional Application 60/291,135, May 15, 2001, of the same title, which is incorporated by reference in its entirety.

BACKGROUND OF THE INVENTION

Alignment of surfaces is a perennial problem in a variety of fields, ranging from construction to interior decorating. Alignment is necessary for walls that should be perpendicular to a floor, or otherwise plumb. Masonry and brick-laying practitioners are well aware of the importance of plumbed and aligned surfaces and chalk lines. A home interior decorated with pictures and other wall ornamentation makes a much better appearance when the ornamentation is aligned, especially with respect to vertical or horizontal alignment. Many mechanical and electrical alignment devices are available, and some laser devices are available. Some of these products are cumbersome, others are not as useful as they could be. Chalk lines, for instance, are sometimes undesirable for use in finished, interior areas.

One aspect of alignment-product performance, and in particular of laser-alignment products, that could be improved is the width, brightness and straightness of the laser light. A visible, straight laser line is acceptable, but may be limited in its brightness over a distance, and may also tend to defocus and become dimmer as a user works away from the source of the laser. Rotating lasers are used to project lines on walls perpendicular to the direction of propagation of the laser. Thus, such devices may have limited utility or may not work in confined spaces requiring a longer alignment tool.

Moreover, a conventional laser is not well-equipped for projecting a flat or planar beam of light. The essence of laser light is that it is coherent or substantially monochromatic, that is, of a single wavelength or a narrow wavelength band. Thus, when a beam of laser light is refracted through a prism, the prism output is not a spreading of the beam as with ordinary "white" light, but rather a coherent, focused beam, very similar to the input. The laser beam is thin and is usefully only visible when projected onto a surface.

Another aspect that could be improved is the inability of laser devices to work around obstructions. That is, if a wall-hanging, such as a picture frame, interrupts the laser beam, it may be blocked from further projection. Therefore, it is necessary to mark locations or heights, one by one, rather than working with the actual objects, in order to align them. Obstructions may include moldings placed in a doorway, picture frames in the way of those being aligned on one horizontal line, the operator of the device, other obstacles, or even textured or stuccoed surfaces on interior walls.

There are devices that direct a laser beam parallel to but away from a surface requiring alignment. A marker device or detector component is then used to sight the beam and mark corresponding locations on the wall adjacent the beam. Use of such a device requires multiple components and at least two people, one to align the laser and another to mark the wall. Moreover, the wall itself requires marking with this method.

A conventional laser beam projector is thus not able to project a laser line on the wall on which it is mounted, nor can it go around obstructions. A laser alignment beam mounting on the wall where alignment is needed would allow a person seeking alignment, whether a carpenter, a painter, or an interior decorator, to accomplish his or her task in a quicker and easier fashion. The ability to work around obstacles would save much time and effort. Finally, such laser alignment devices must be aligned themselves, and are typically equipped with a tripod and a sophisticated leveling device so that they read true for horizontal and vertical plumbs. While leveling is necessary, such sophistication as a tripod adds to the expense and bulkiness of the leveling device. What is desired is a convenient, easy-to-level laser device useful for aligning objects.

BRIEF SUMMARY OF THE INVENTION

One embodiment of the invention is a laser line generating device. The line generating device includes a housing. Within the housing are mounted a light source and a power supply connected to the light source. There is a projection lens that receives light and projects the light in the shape of a fan. There is also at least one reference level on an outside of the housing. The light is projected substantially along its direction of propagation onto the wall on which it is mounted. Another embodiment is a line generating device. The line generating device includes a housing and a light source mounted within the housing. There is a power supply connected to the light source, and there is a projection lens that receives light and projects the light in a direction of propagation in the shape of an elongated fan that substantially lies within a plane that is oriented at an angle with respect to the direction of propagation.

Another embodiment is a method for projecting a fan-shaped laser light onto a surface. The method includes focusing a light into a fan shape that substantially lies within a plane, and projecting the fan-shaped light in a direction of propagation that is oriented at an angle with respect to the plane. Another embodiment is a line generating device. The line generating device includes a housing and a light source mounted within the housing. Within the housing there is also an optical system that receives light and projects the light as a fan-shaped beam that lies substantially within a plane and forms a visible line at an intersection of the beam and a surface of interest. Another embodiment is a lens for receiving and projecting light. The lens includes an optical material, and has at least one corner radiused from about 0.030 to about 0.060 inches. The lens is adapted to receive light and to transmit light in a fan-shaped beam.

The following drawings form part of the present specification and are included to further demonstrate certain aspects of the present invention. The invention may be better understood by reference to one or more of these drawings in combination with the detailed description of specific embodiments presented herein.

BRIEF DESCRIPTION OF SEVERAL VIEWS OF THE DRAWINGS

FIGS. 9A–9C depict a laser line generating device projecting the laser light in a narrow asymmetric beam or fan and aligning objects on a wall.

FIGS. 10 and 11 depict lens geometries useful for lenses in the present invention.

DETAILED DESCRIPTION OF THE PRESENTLY PREFERRED EMBODIMENTS

Figure 1:
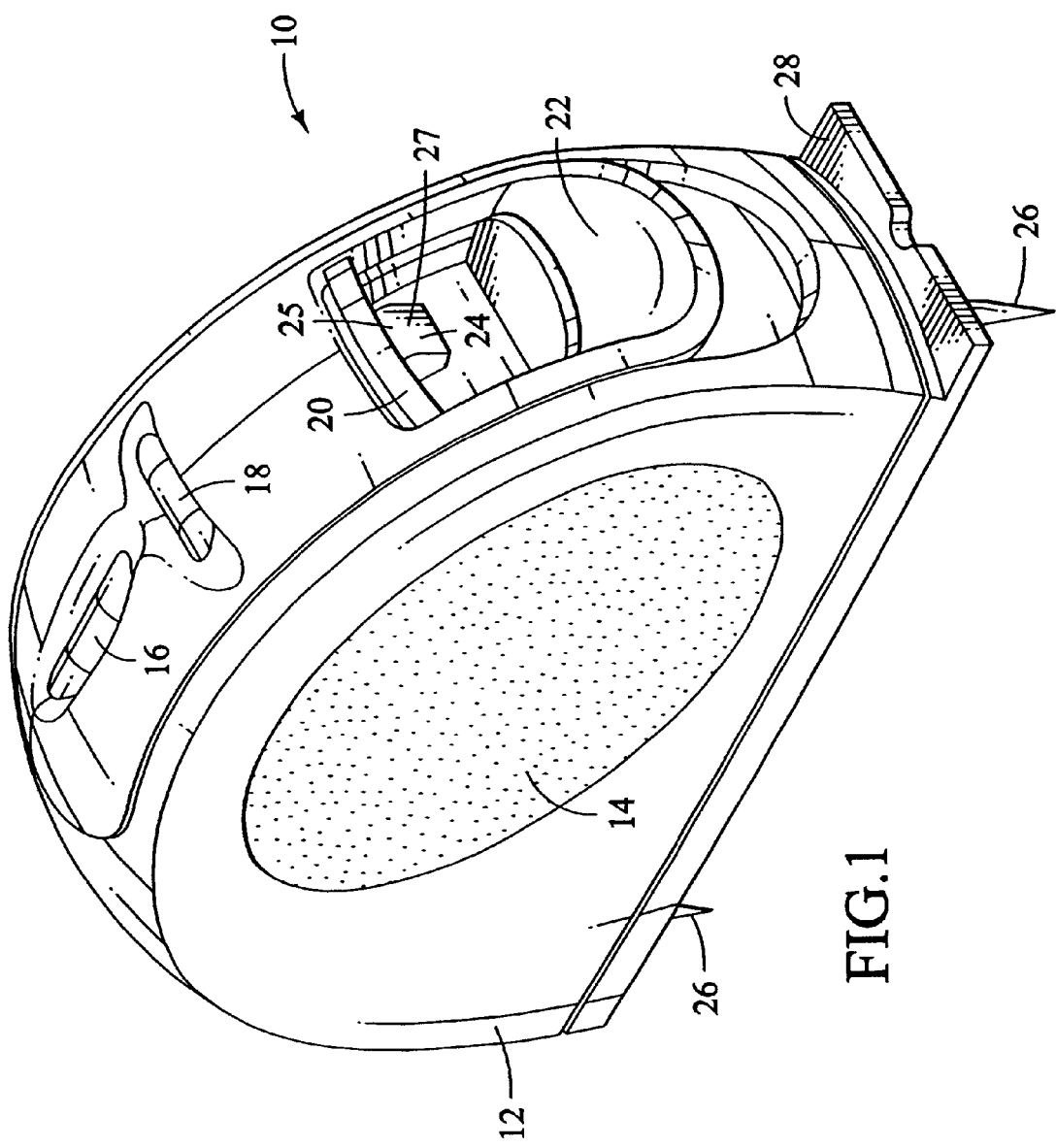
FIG. 1 is an isometric view of an outside of an embodiment of a laser line generator according to the present invention.

The present invention-is better understood by reference to the figures and description below. FIG. 1 presents a view of a laser alignment device and generator 10. The generator comes in a housing 12, which may be made of plastic or other suitable material such as metal. It possesses a handgrip area 14 for handling, the area preferably made of an elastomeric substance for easier gripping. The generator has a first leveling device 16, a spirit level or "bubble" for orientation or leveling in one plane, such as horizontal or vertical. It also has a second leveling device 18, for orientation or leveling in a second plane perpendicular to the first plane. The housing also contains a protective door 20 with a linked switch for turning on the laser light source when opening the door for access to the laser beam. The generator also may have one or more sliding levers 22 suitably mechanically connected for extending or retracting one or more pins 26 from the generator bottom 28. Each pin desirably penetrates into a surface, such as a drywall or lumber surface, to suspend and hold the laser generator on the surface while it is in use. FIG. 1 depicts the door 20 in an open position and a projection lens 24. The door or aperture 20 provides an exit for the light generated within the housing, and in the open position, does not substantially block the exit of light from the housing.

As shown in FIG. 1, a preferred projection lens 24 includes a rounded corner 25 on its front face 27. The effect of the lens is to shape the laser light into a planar, fan-shaped "comet beam" or fan shape. The intensity of the light and the shape of the beam may be asymmetric, in which one side of the "comet" may be larger and brighter than the other side. The fan shaped beam is then routed so that the less bright side of the lens is nearest the wall of interest, and the brighter side is away from the wall. In this orientation, the fan-shaped beam of light will propagate a long distance from its origin, and the laser light will be usable a long distance away from the laser line generating device.

The laser light generated by the laser line generator preferably exits from the top, curved corner of the lens. The radius of the corner is desirably from about 0.030 inches (0.75 mm) to about 0.060 (1.50 mm) inches, and preferably about 0.047 inches (1.2 mm). The height of the rounded corner of the lens is desirably one or two inches above the bottom surface of the laser line generating device. When the beam or fan of light exits the lens, it forms a thin plane in the length-wise direction of the device, and the beam forms a plane from the top, curved corner of the lens downward, to the wall or other surface on which alignment is sought. Because the light is now a plane, rather than a thin pinpoint, it is able to project over and beyond obstacles, allowing a user to align several objects without having to move them.

In the embodiments shown, the laser light projects in the direction of the alignment surface, a generally flat, planar bottom support surface. The direction of propagation is the direction the light travels, generally parallel to the wall on which the laser line generating device is mounted. The fan-shaped aspect of the beam is perpendicular to the wall, and is preferably no higher than the height of the lens 24 above the wall. The laser light generating device and its lens are mounted on the wall, and the fan-shape of the beam extends from a height of the lens above the wall to the wall surface itself, in a very thin plane, about $\frac{1}{32}$ of an inch thick. The plane of the fan-shaped beam is also perpendicular to the flat bottom surface of the laser line generating device.

Figure 2:
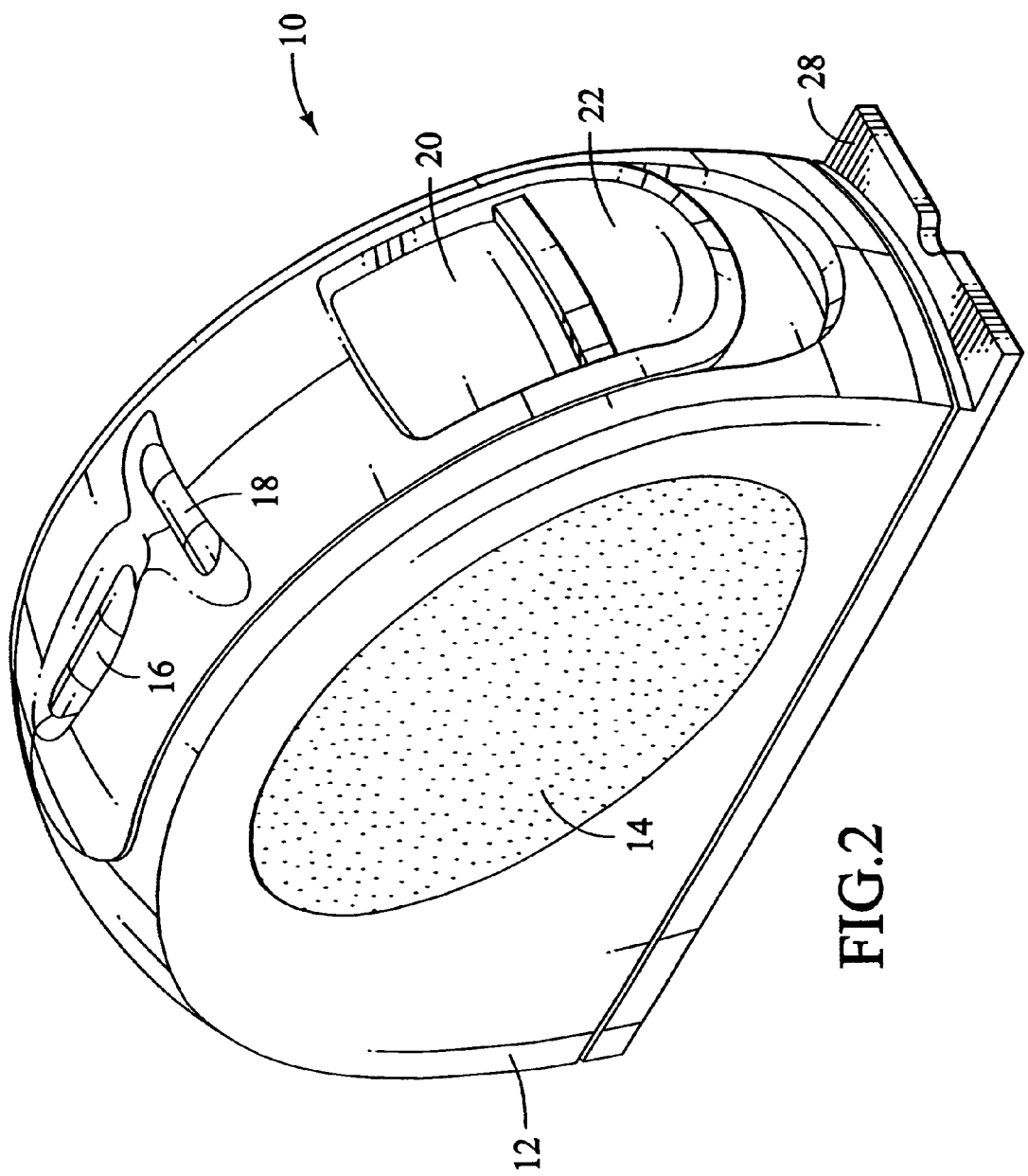
FIG. 2 is an alternate view of the generator of FIG. 1.

FIG. 2 depicts the same device with the door 20 closed, and with a linked internal switch (not shown) open, and the laser thus off. The figure depicts the generator 10, housing 12, gripping surface 14 and levels 16, 18 with pin lever 22 raised so that the pin remains inside the housing and the laser generator is not suspended on a wall or other surface. The door or aperture 20 may also be a switch for the power supply of the laser line generating device. In the position shown in FIG. 2, with the door closed, the switch is preferably in a closed position and there is no power supplied from the power supply to the light source. In this position, the door acts as a lens cover and substantially blocks the exit of the device.

Figure 3:
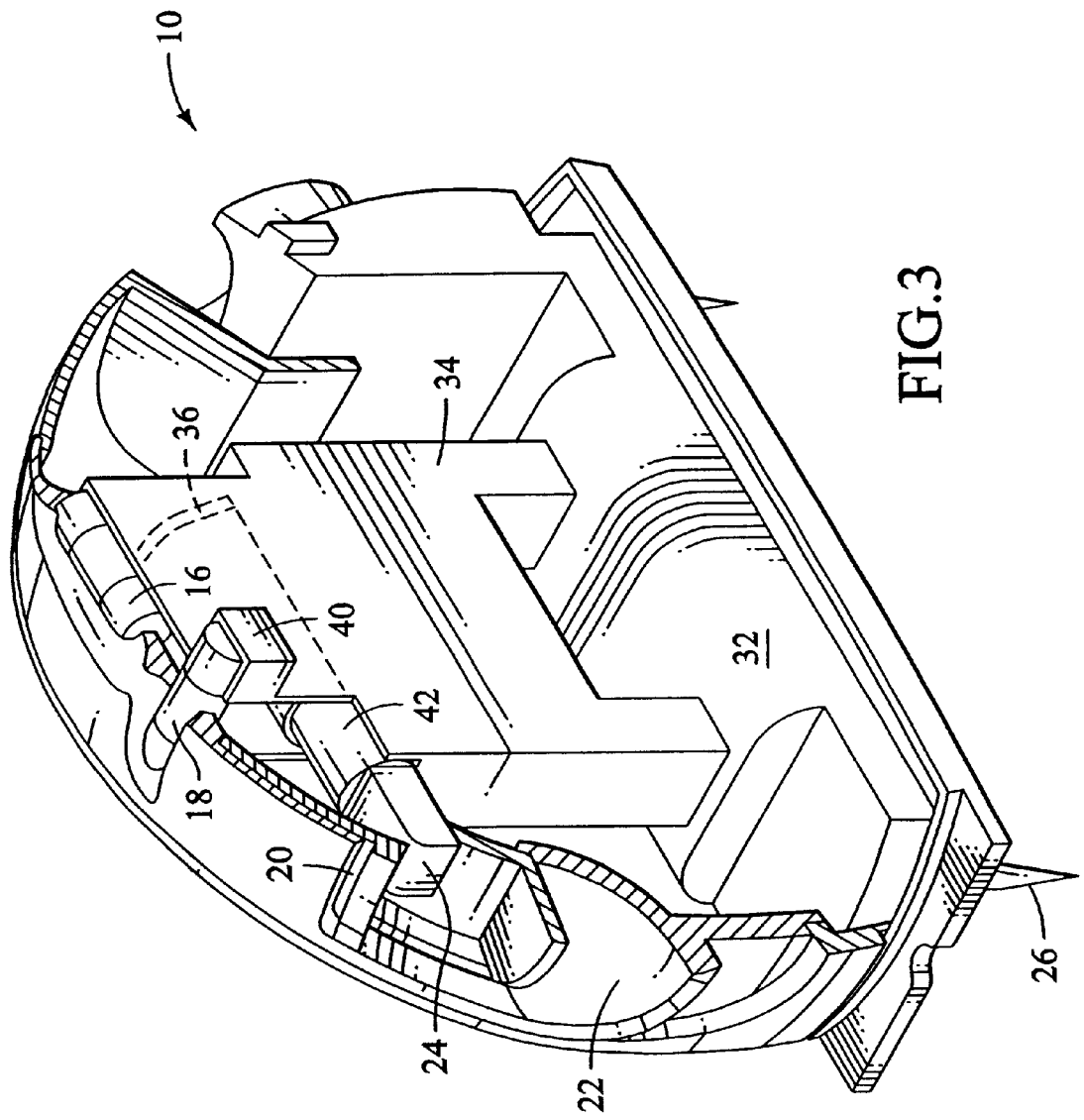
FIG. 3 is a cutaway isometric view showing the inside of the generator of FIG. 1.
Figure 4:
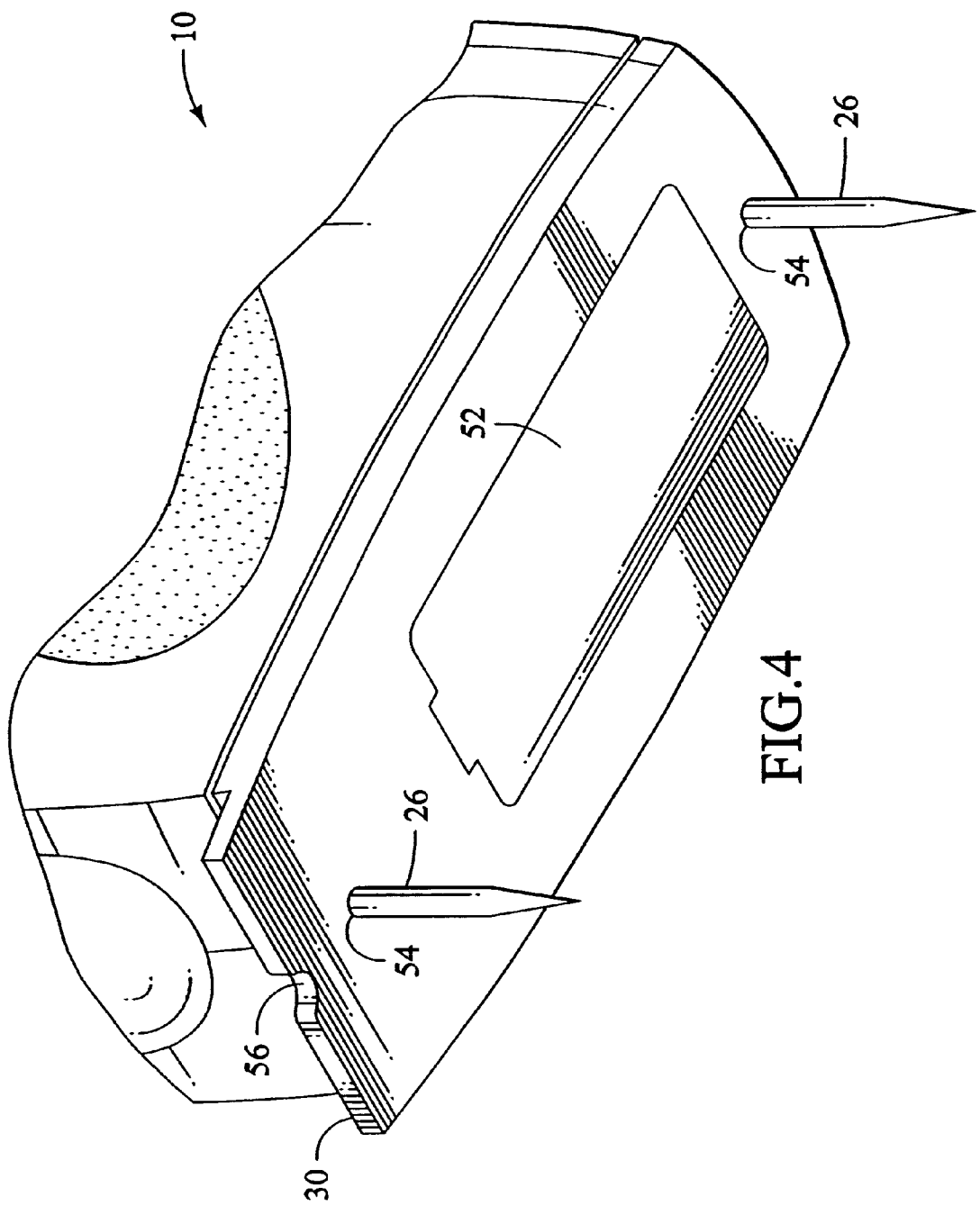
FIG. 4 is a view depicting the bottom of the generator of FIG. 1.
Figure 5:
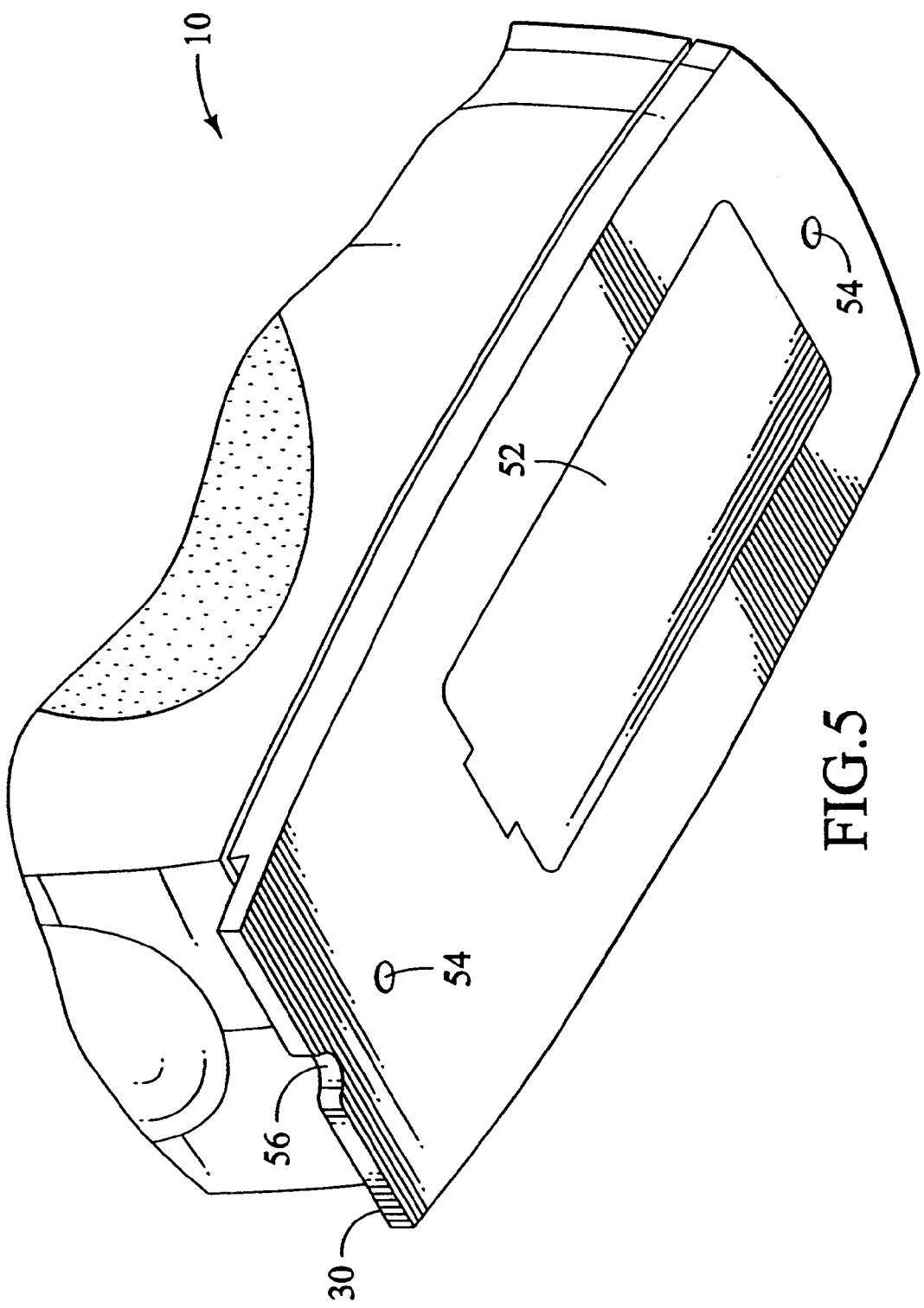
FIG. 5 is another view depicting the bottom of the generator of FIG. 1.

FIG. 3 depicts a cutaway view of the interior of the laser generator, showing a supporting structure 34, 40 for levels 16, 18, and also showing an area for a power source or battery 32, a laser diode 42, a lens 24, and a circuit board 36. FIG. 4 more clearly depicts a view from the bottom or fist face 30 of the generator 10. The bottom surface desirably has a door 52 for access to a battery or power source for the generator. Also shown are holes 54 for the retractable pins 26 used to secure the generator to a wall or a surface. A notch 56 may also be useful for aligning or orienting the generator on a surface. FIG. 5 depicts the bottom of the laser generator with the pins retracted, with a better view of holes 54.

A method of practicing the invention includes providing a surface, such as a wall wherein orientation with a line is desired, and also providing the laser generator. A user mounts the laser generator 10 via its flat surface and one or more pins onto the wall and orients it in one or more planes, depending on the number of pivot points and on the number of reference levels provided on the generator. Typically, a user will mount the generator 10 with a pin or retainer placed through a pivot point on the flat surface of the generator. The reference level such as the bubble level 18 is then used to orient and true the generator in one plane, for instance, the vertical plane. The second bubble level 16 may be used if the user wishes to orient the generator in a horizontal plane. When the user is satisfied with the orientation, the user turns on the generator 10, projecting a laser beam from the vertical or horizontal plane of the device. In one embodiment, the generator is turned on by opening the lens door or aperture. In addition to the retractable pins used as pivot point, the device may have apertures or holes placed in the flat bottom surface. In this method, a user inserts pins or nails through the holes and mounts, levels, and supports the laser generator using those pins.

A desirable feature of the invention is that the output of the generator is not merely a linear beam of light, but rather a fan-shaped beam. The fan-shaped beam propagates along the surface of the wall in the direction of propagation. Because the plane of the beam runs perpendicular to the wall along the length of the beam, the line of intersection between the beam and the wall forms a visible line of alignment. With a fan-shaped beam, the laser light is able to project over and beyond obstacles, such as moldings placed in a doorway, picture frames in the way of those being aligned on one horizontal line, or other obstacles, such as a wavy or stuccoed surface on an interior wall. With a conventional laser generator, these obstacles must be removed or the laser itself must be repositioned to avoid each obstacle. Of course, moving and relocating the laser alignment tool destroys the continuity of the line of alignment. Moreover, a conventional laser is not well-equipped for shaping the laser beam into a fan. The essence of laser light is that it is coherent, that is, of a single wavelength or a narrow wavelength band. Thus, when laser light is refracted through a prism, the prism output is not a spreading of the beam as with ordinary "white" light, but rather a coherent, focused beam, very similar to the input. The present invention overcomes this obstacle by sending a sharp, focused pinpoint of light through a specifically constructed lens to create a flat planar, fan-shaped beam of light.

It is also noteworthy that the axis of alignment, such as the alignment of pictures on a wall, is substantially parallel to the direction of propagation of the laser light. By contrast, a conventional and less useful method is to project a laser light perpendicular to a wall or other surface in which alignment is desired, and perpendicular to the direction of propagation. With the instant laser line marking device, a user projects a fan-shaped beam in a propagation direction that is substantially parallel, rather than perpendicular, to the surface on which alignment is desired, the fan-shaped dimension of the beam being perpendicular to the wall.

As seen in FIG. 9a, the laser line generating device propagates light in the length-wise direction of the laser line generating device 10. The direction of propagation, shown by arrow 84, is substantially parallel to the wall, with the fan-shaped aspect of the beam being perpendicular to the wall. In one example, if a narrow fan projects from a line marking device according to the present invention, the beam is "substantially parallel" if it is substantially parallel for at least several lengths of the line marking device in the direction of propagation of the laser. It is substantially parallel because even a "narrow" fan spreads rapidly and the beam is no longer strictly parallel. The device and the beam are easily distinguished, however, from a beam that has a direction of propagation perpendicular to the wall, such as shown in U.S. Pat. No. 5,208,438.

The laser light exits the lens or prism in an elongated fan in a direction of propagation. The direction of propagation, as discussed above, is substantially parallel to the surface on which alignment is desired. The width of the fan, however, is perpendicular to the surface, and the intersection of the beam with the surface generates the visible line of alignment that the user seeks. It is this width that allows the fan to project over and beyond obstacles. That is, even though an obstacle may partially obscure the fan-shaped beam of light, at least part of the fan-shaped beam extends above and beyond the obstacle, and a user may continue to align objects on which alignment is desired.

Figure 6:
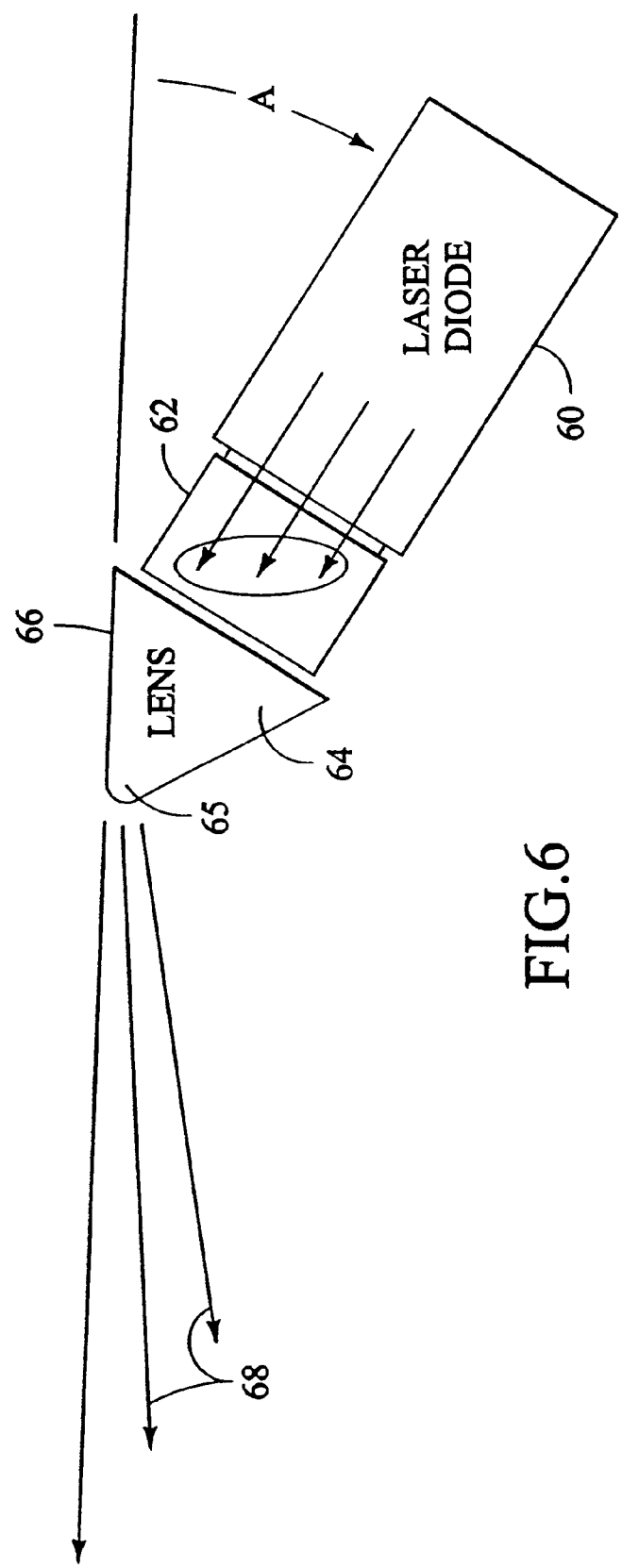
FIG. 6 depicts an embodiment of optics to be used with the laser light generator of FIG. 1.

FIG. 6 depicts an embodiment of the invention, in which a laser diode 60 emits coherent laser light, such as, coherent laser light at 635 nm wavelength. The light is collimated into an ovate shape by collimation optics 62, for instance at least one collimating lens, by techniques well known to those skilled in optic arts. The ovate beam then enters a projection lens 64 from the right side in FIG. 6, desirably at an angle in which total internal reflection will occur, that is, all the incident light will be reflected rather than refracted from the back face of the lens. It has been found that this phenomenon is reinforced further if the back surface 66 of the lens is mirrored. The phenomenon is also reinforced if a corner of the lens or prism is radiused as mentioned above. When the light emerges from the radiused corner 65 of the projection lens 64 in FIG. 6, it is in the shape of a narrow beam or fan, rather than a single point or beam of light, and is able to extend around and beyond obstacles for the convenience of a user. In one embodiment of the invention, the angle A between the mirror surface of the collimating lens and the incident light from the laser diode source is from about 60 to about 65 degrees, preferably about 63 degrees, for maximum reflection of light through the lens, rather than refraction at angles that detract from the performance of the generator. In this depiction, the light 68 is planar within the plane of the paper, when it leaves the lens. In one embodiment of the invention, the laser diode, the collimation lens, and the projection lens are contained within a single element, such as a laser diode with included collimating optics.

In one embodiment shown in FIG. 6, an aspherical projection lens is made from optic grade glass, in the form of an equilateral triangle with the back face mirrored. Desirably, the lens is about 0.45 inches on a side, with one corner 65 radiused to about 0.030 to about 0.060 inches and the other corners rounded to a radius of 0.005 to 0.015 inches. With this geometry, the lens or prism is able to focus an incoming ovate beam into a planar, thin, fan-shaped beam that is useful for aligning objects.

Figure 7:
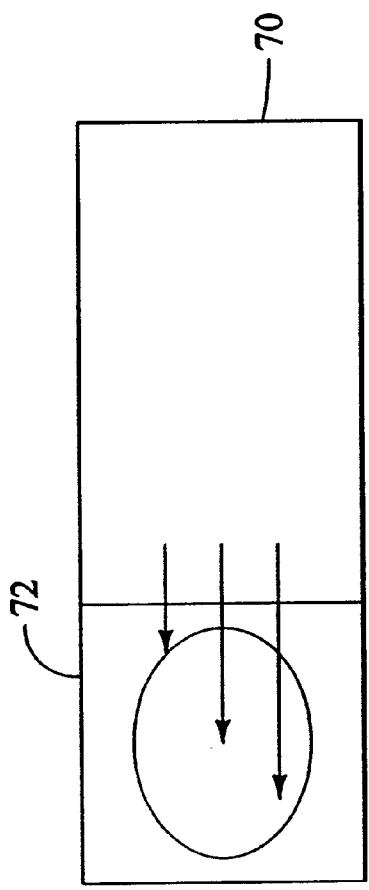
FIG. 7 depicts a side view of the workings of a second embodiment of laser light generator optics to be used with the laser line generator of FIG. 1.
Figure 8:
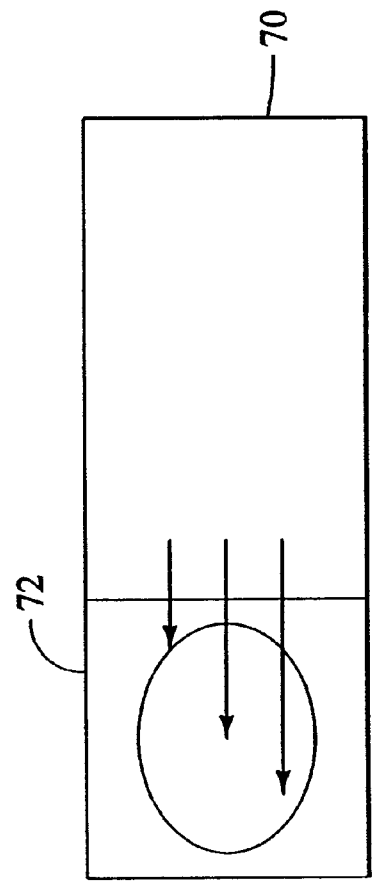
FIG. 8 depicts a top view of the workings of the laser light generator optics of FIG. 7.

FIG. 7 depicts a side view of another embodiment of the invention, in which a laser light source 70, such as a laser diode, emits laser light, which is collimated into an ovate shape by collimating optics 72 and then sent to an aspherical projection lens 74 with one corner 75 radiused as mentioned above for projection of a narrow fan of light 76. In one embodiment, the axes of the ovate-shaped beam sent to the lens are about 3/16 inches by about 1/16 inch. The planar, fan-shaped beam 76 emerging from projection lens 74 is than about 1/32 inch thick. Note that the top corner 75 on the face of the lens in FIG. 7 is radiused from about 0.030 to about 0.060 inches, and preferably about 0.047 inches. FIG. 8 depicts the same embodiment in a top view, in which the rounding may not be observable. The source of laser light 70 generates visible laser light and the collimating optics 72 shape the light into a narrow beam. From the top view, the beam of light is very thin and is about the width of the projection lens 74, 0.4 inches wide. From the side view, the projected light is a thin beam; from the top view, the projected light is a thin fan.

One embodiment of the invention features a lens, such as the lenses depicted in FIGS. 7 and 8, that is about 0.4 inches (10 mm) square, and about 0.1 inches thick (2.5 mm) in the direction of propagation, that is able to focus the incoming laser light beam and reflect it into a planar fan shape. The lenses are aspherical, cylindrical lenses. The lens may be made from one of several optical-grade clear, highly transparent materials, including BK7 glass having an index of refraction of about 1.5168 and a Vd of 64.17. In another embodiment, acrylic resin having an index of refraction of 1.4917 and a Vd of about 55.31 is useful. It has been found that the lens works better if the exit face has only one corner radiused about 0.047 inches, with the other faces being radiused for normal manufacturing custom, to about 0.005 to about 0.015 inches.

FIG. 9A demonstrates the use of an embodiment of a laser generator 10 according to the present invention, in which a fan-shaped beam 76 is able to align a first picture frame 78 on wall 77. The generator is convenient to use because it projects a laser beam on the wall adjacent the generator. The beam is able to overcome obstacles such as door moldings 80 with its fan shape and extend above the molding with sufficient clarity to align another object, such as picture frame 82. It is able to overcome these obstacles because the corner from which the light exits is one or two inches removed or offset from the wall, allowing a fan or beam of light to form. The direction of propagation 84 is in the direction from the generator to the objects on which alignment is desired, such as picture frames. At the same time, the width of the fan is perpendicular to the wall 77 on which the paintings are hung or on which, more generally, alignment is desired. The fan-shaped beam 76 intersects the wall 77 and the light is visible on the wall at the intersection 79 of the fan-shaped beam 76 with the wall 77. In one embodiment, the housing of the laser line generator is a support face that substantially extends along a first planar surface, such as wall 77, and the fan shaped beam 76 substantially lies within a second planar surface, such as the plane of light 76. The second planar surface may intersect the first planar surface at an angle. The angle may preferably be 90°, or a right angle between the fan-shaped beam and the surface on which objects are to be aligned.

The "comet" effect means that the IntensIty of the planar fan is less nearer the wall and greater away from the wall, so that the beam is able to usefully travel further, and enable a user to align objects at greater distances. Thus, in the embodiment shown in FIG. 9B and FIG. 9C, the intensity of the laser light will be greater at outer edge 87 than at the inner edge 85 where the fan-shaped beam intersects the wall 77 while the beam is used to align object 82, such as a picture frame. There is no practical limitation to the distance the fan-shaped beam can travel. Laser diodes of 5–15 mW can be successfully used to project beams 30–50 feet long along painted wall-board surfaces. In one embodiment, the fan-shaped beam is projectable as a visible line extending at least about 5 lengths of the housing away from the housing for aligning objects. FIG. 9C schematically depicts the comet effect or asymmetry of the planar fan, the Intensity of light being greater in the portion of the beam that is further away from the wall or plane of interest.

Figure 10:
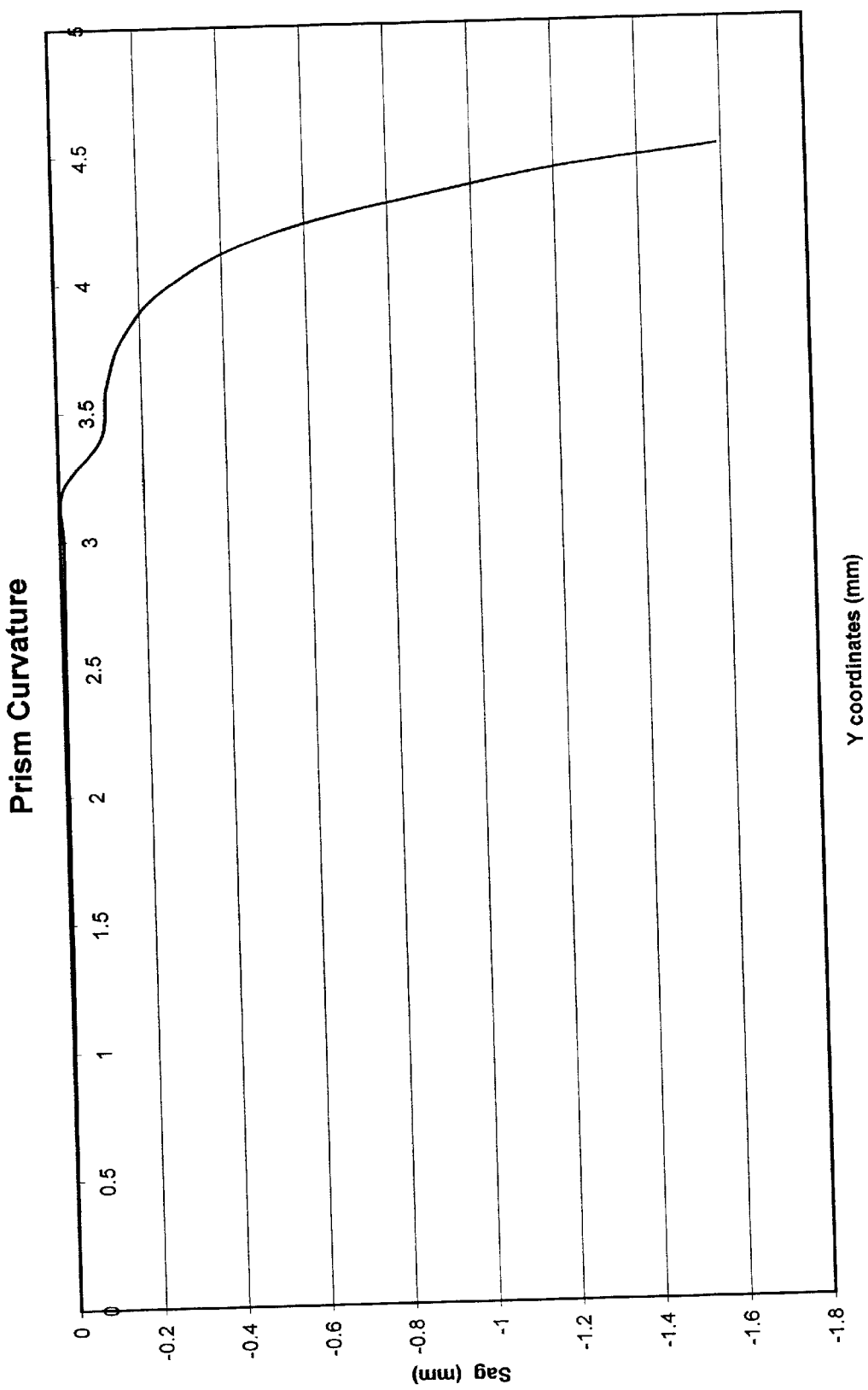

FIGS. 10 and 11 depict geometries of projection lenses that can be useful in connection with this invention. FIG. 10 depicts the sag or curvature of the exit face of the lens (z-direction deviation plotted against the depth or y-coordinates of the lens), while FIG. 11 depicts the overall profile or curvature of the lens surface. While these particular embodiments work well, the invention is not limited to these embodiments, and other embodiments will also suffice.

While this invention has been shown and described in connection with the preferred embodiments, it is apparent that certain changes and modifications, in addition to those mentioned above, may be made from the basic features of this invention. For instance, lenses may be made from glasses other than BK7 and plastics other than acrylic, so long at they are transparent and to a degree sufficient to be used as a lens or article for transmitting light. While embodiments of triangular prisms and relatively flat square lenses have been successful, other polygons or aspherical embodiments may also be used, so long as they have a radiused corner of about the requisite dimension. In other embodiments of a laser generating device, alignment may be made in lines or planes that are diagonal, rather than horizontal or vertical. While one or more pins may be used to hold the generator onto a wall, other devices may be used as retainers. These devices include, but are not limited to, a string or a wire, a fastener, tape, putty-type substances or other adhesives. While the laser line generator may be most convenient to use when pinned to a wall, it may also be mounted on a table, floor, or other flat surface, and used to project a line without being mounted on a wall. Many other variations of our invention may also be used without departing from the principles outlined above. Accordingly, it is the intention of the applicants to protect all variations and modifications within the valid scope of the present invention. It is intended that the invention be defined by the following claims, including all equivalents.

What is claimed is:

1. A line generating device, comprising:
   a housing comprising a support face that substantially extends along a first planar surface;
   a light source mounted within the housing;
   a power supply connected to the light source;
   a projection lens that receives light and projects the light in the shape of a fan, wherein the housing and the fan substantially lies within a second planar surface that intersects the first planar surface at an angle;
   at least one reference level on an outside of the housing;
   a retractable pin extending from the line generating device;
   an aperture in the housing, the aperture providing an exit for the light and a cover switchably connected to the power supply, wherein when the cover moves to a first position the light source is connected to the power supply and the cover does not substantially block the exit and when the cover moves to a second position the light source is not connected to the power supply and the cover substantially blocks the exit; and
   a lever that contacts the pin and is attached to the line generating device, whereby the lever is manually actuated without use of external factors other than direct human contact for pushing the retractable pin into a surface.

2. The device of claim 1, further comprising an opening in the support face through which the pin extends.

3. The device of claim 1, wherein the support face is integral with the housing.

4. The device of claim 1, wherein the pin has a distal end that defines a point.

5. The device of claim 1, wherein the pin does not rotate during retraction.

6. The device of claim 1, wherein the pin is retractably mounted to the housing.

7. The device of claim 1, wherein the pin is retractable into the housing.

8. The device of claim 8, wherein said lever comprises a sliding member for moving the retractable pin into a surface.

9. A line generating device, comprising:
   a housing having a face and a closable aperture;
   a light source mounted within the housing;
   a battery switchably connected to the light source;
   a lens that receives light and projects the light;
   a retractable pin and a second pin that each extend from the line generating device;
   at least two bubble levels at right angles to each other on an outside of the housing;
   an aperture in the housing, the aperture providing an exit for the light and a cover switchably connected to the battery, wherein when the cover moves to a first position the light source is connected to the battery and the cover does not substantially block the exit and when the cover moves to a second position the light source is not connected to the battery and the cover substantially blocks the exit; and a lever that contacts the retractable pin and is attached to the line generating device whereby the lever is manually actuated without use of external factors other than direct human contact for moving the retractable pin into a surface.

10. The device of claim 9, wherein the light source generates a laser beam.

11. The device of claim 9, wherein the lens projects the light in the shape of a fan.

12. The device of claim 9, wherein the face is integral with the housing.

13. The device of claim 9, wherein said lever comprises a sliding member for moving the retractable pin into a surface.

14. The device of claim 9, further comprising an opening in the face through which the retractable pin extends.

15. The device of claim 9, wherein the retractable pin has a distal end that defines a point.

16. The device of claim 9, wherein the retractable pin does not rotate during refraction.

17. The device of claim 9, wherein the retractable pin is retractably mounted to the housing.

18. The device of claim 9, wherein the retractable pin is retractable into the housing.

19. A line generating device, comprising:
a housing;
a light source mounted within the housing;
a power supply connected to the light source;
a projection lens that receives light and projects the light in a direction of propagation in the shape of an elongated fan that substantially lies within a plane that is oriented at an angle with respect to the direction of propagation;
an aperture in the housing, the aperture providing an exit for the light and a cover switchably connected to the power supply, wherein when the cover moves to a first position the light source is connected to the power supply and the cover does not substantially block the exit and when the cover moves to a second position the light source is not connected to the power supply and the cover substantially blocks the exit; and
a lever that contacts a pin and is attached to the line generating device, whereby the lever is manually actuated without use of external factors other than direct human contact for moving the pin.

20. The device of claim 19, wherein the pin extends through an opening in a face of the housing.

21. The device of claim 20, wherein the face is integral with the housing.

22. The device of claim 19, wherein the pin has a distal end that defines a point.

23. The device of claim 19, wherein the pin does not rotate during retraction.

24. The device of claim 19, wherein the pin is retractably mounted to the housing.

25. The device of claim 19, wherein the pin is retractable into the housing.

26. The device of claim 19, wherein said lever comprises a sliding member for moving the retractable pin into a surface.

27. A line generating device, comprising:
a housing comprising a substantially flat face;
a retractable pin extending from the line generating device;
a light source mounted within the housing;
an optical system that receives light and projects the light as a fan-shaped beam that lies substantially within a plane and forms a visible line at an intersection of the beam and a surface of interest;
an aperture in the housing the aperture providing an exit for the light and a cover switchably connected to a power supply, wherein when the cover moves to a first position the light source is connected to the power supply and the cover does not substantially block the exit and when the cover moves to a second position the light source is not connected to the power supply and the cover substantially blocks the exit; and
a lever that contacts the retractable pin and is attached to the line generating device, whereby the lever is manually actuated without use of external factors other than direct human contact for moving the retractable pin into a surface.

28. The device of claim 27, wherein the substantially flat face is integral with the housing.

29. The device of claim 27, wherein said lever comprises a sliding member for moving the retractable pin into a surface.

30. The device of claim 27, further comprising an opening in the face through which the pin extends.

31. The device of claim 27, wherein the pin has a distal end that defines a point.

32. The device of claim 27, wherein the pin does not rotate during retraction.

33. The device of claim 27, wherein the pin is retractably mounted to the housing.

34. The device of claim 27, wherein the pin is retractable into the housing.

35. A line generating device, comprising:
a housing;
a retractable pin mounted for movement relative to the housing;
a light source mounted within the housing; and
a power supply connected to the light source;
an aperture in the housing, the aperture providing an exit for the light and a cover switchably connected to the battery, wherein when the cover moves to a first position the light source is connected to the battery and the cover does not substantially block the exit and when the cover moves to a second position the light source is not connected to the battery and the cover substantially blocks the exit; and
a lever that contacts the retractable pin and is attached to the line generating device, whereby the lever is manually actuated without use of external factors other than direct human contact for moving the retractable pin into a surface.

36. The device of claim 35, further comprising at least one lens that receives light from the light source.

37. The line generating device of claim 36, wherein the at least one lens that receives light from the light source projects the light as a fan-shaped beam.

38. The line generating device of claim 35, wherein the light source comprises a laser light source.

39. The line generating device of claim 35, further comprising at least one reference level on the housing.

40. The device of claim 35, wherein said lever comprises a sliding member for moving the retractable pin into a surface.

41. The device of claim 35, wherein the pin has a distal end that defines a point.

42. The device of claim 35, wherein the pin does not rotate during retraction.

43. The device of claim 35, wherein the pin is retractably mounted to the housing.

44. The device of claim 35, wherein the pin is retractable into the housing.

45. A method of aligning an object with a light beam, the method comprising:

positioning a light generator with a retractable pin adjacent to a surface;

mounting the light generator to the surface via manually actuating the retractable pin without the use of external devices so that the retractable pin penetrates the surface;

generating light from the light generator along a direction of propagation so that a line is formed along the surface, wherein the line is interruptible in that should an impediment be positioned on the line, the line will be present on either side of the impediment, wherein the generating comprises moving a cover from a first position to a second position that causes light from the light generator to be generated and to pass through an exit that is blocked by the cover at the first position; and placing an object so that a portion of the object is aligned by the light.

46. The method of claim 45, wherein the method generates light in the shape of a fan that lies substantially in a second planar surface that intersects the first planar surface at an angle.

47. The method of claim 46, wherein the angle is about 90°.

48. The method of claim 45, further comprising focusing the light into a fan-shaped beam offset from the surface by a distance.

49. The method of claim 45, wherein the mounting comprises moving a lever of the light generator that causes the pin to enter into the surface.

50. The method of claim 49, wherein the pin does not rotate during the moving of the lever.

51. The method of claim 45, further comprising removing the light generator from the surface after the placing has been completed and then retracting the pin into the housing.

52. The method of claim 45, wherein after the placing the cover is moved from the second position to the first position that causes the light generator to cease generating light.

53. A line generating device, comprising:

a housing comprising a support face that substantially extends along a first planar surface;

a light source mounted within the housing;

a power supply connected to the light source;

a projection lens that receives light and projects the light in the shape of a fan, wherein the housing and the fan substantially lies within a second planar surface that intersects the first planar surface at an angle;

at least one reference level on an outside of the housing;

a retractable pin extending from the line generating device, the pin comprising a first end and a second end, wherein the first end is accessible exteriorly of the line generating device and the second end cannot be directly contacted exteriorly of the line generating device;

an aperture in the housing, the aperture providing an exit for the light and a cover switchably connected to the power supply, wherein when the cover moves to a first position the light source is connected to the power supply and the cover does not substantially block the exit and when the cover moves to a second position the light source is not connected to the power supply and the cover substantially blocks the exit; and a lever that contacts the pin and is attached to the line generating device, whereby the lever is manually actuated exteriorly of the line generating device and such manual actuation causes the retractable pin to move.

54. The device of claim 53, wherein the manual actuation of the lever is performed without use of external factors other than direct human contact for moving the retractable pin.

* * * * *